United States Patent Office 3,213,446
Patented Oct. 19, 1965

3,213,446
INTERROGATION RADAR SYSTEMS
Zbigniew Frank Voyner, London, England, assignor to A. C. Cossor Limited, London, England, a British company
Filed Sept. 4, 1962, Ser. No. 220,991
Claims priority, application Great Britain, Sept. 6, 1961, 32,049/61
6 Claims. (Cl. 343—6.5)

The present invention relates to secondary radar systems in which recurrent groups of pulses of radio frequency oscillations are transmitted and are picked up by a transponder which is arranged to transmit a signal when the interrogating signals picked up have predetermined characteristics. The interrogating transmissions may be from a ground station and the transponder may be in an aircraft.

It is necessary to transmit interrogating pulses from a directional aerial and such an aerial radiates not only in a main lobe but also in side lobes and it is important to prevent actuation of the transponder by signals transmitted in the side lobes.

One secondary radar system, which is the subject of international agreement, employs recurrent pairs of pulses A and B of which the first A is a control pulse radiated from an omnidirectional aerial intended to provide the suppressive function required to prevent response to side lobes of a directional aerial from which pulses B are transmitted. The transponder is so arranged that it is actuated only when the ratio of the amplitude of received pulse B to that of received pulse A is greater than a predetermined value.

Another system has been proposed employing recurrent groups of three pulses of which the first and third $A_1$ and $B_1$ are interrogating pulses radiated from a directional aerial and the second $C_1$ is a control pulse radiated from an omnidirectional aerial. For actuation of the transponder, the ratio of the amplitude of received pulses $A_1$ and $B_1$ (which may be of equal amplitude) to that of received pulse $C_1$ must exceed a predetermined value.

The groups of pulses may be radiated, for example, at a recurrence frequency of about 400 per second.

In the first of the above-mentioned systems the operative range is limited to that at which the control pulse is effective. The fact that side-lobes of the interrogator beam at the back of the aerial, for instance, are substantially smaller than the major side-lobes permits a distortion of the control pulse radiation pattern from a truly omnidirectional one, such distortion allowing power to be conserved by not providing signal intensities in directions where such intensities are not required. In an effort to shape the control pulse radiation pattern it follows, in order to increase range, that to increase the extent of the control pulse radiation pattern in the direction of the interrogator beam is also desirable. It has been proposed to radiate a small amount of energy in appropriate phase from the directional aerial simultaneously with the radiation of each control pulse from the omnidirectional aerial, thus superimposing a reduced version of the interrogator pulse radiation pattern on the omnidirectional pattern. In this way the power radiated during control pulses can be reduced.

It has however been found important to ensure that the energy radiated during each control pulse should be substantially constant (for example within 2 db) over a substantial azimuthal angle, for example an angle corresponding to the width of the main lobe of the directional polar diagram between points 9 db below the peak. The reason for this is that transponders are liable to vary in performance owing for example to thermal drifts, heating variations in transformers and ageing in valves, and it is necessary to provide sufficient tolerance in the system to cope with such variations.

The present invention has for its principal object to provide an improved arrangement for transmitting control and interrogating pulses with which the energy radiated during control pulses can be made substantially less than with known arrangements and with which, nevertheless, the energy radiated during control pulses can be made substantially constant over a suitable azimuthal angle.

A subsidiary object of the invention is to provide an arrangement which can readily be adjusted for use with either a two-pulse or a three-pulse system. With a three-pulse system as at present proposed it is required that there should be a trough in the control pulse radiation in the direction of the main interrogator lobe instead of a hump.

According to the present invention there is provided a secondary radar transmitter having a control aerial adapted to radiate nearly omnidirectionally and a directive interrogating aerial comprising a large number of aerial elements, wherein there are provided means for generating recurrent groups of radio frequency pulses, each group comprising at least one control pulse and at least one interrogating pulse, means for feeding the interrogating pulses to all the elements of the directional aerial in such a manner as to produce a narrow beam of radiation and means for feeding the control pulses to the control aerial and simultaneously to a portion only of the elements of the interrogating aerial in such a manner as to produce a nearly omnidirectional radiation pattern with a hump or trough therein in the direction of the said narrow beam.

The control aerial may be constituted by or may include an aerial element of the directive aerial or it may be a separate element.

The invention will be described, by way of example, with reference to the accompanying drawing in which—

Figure 1:
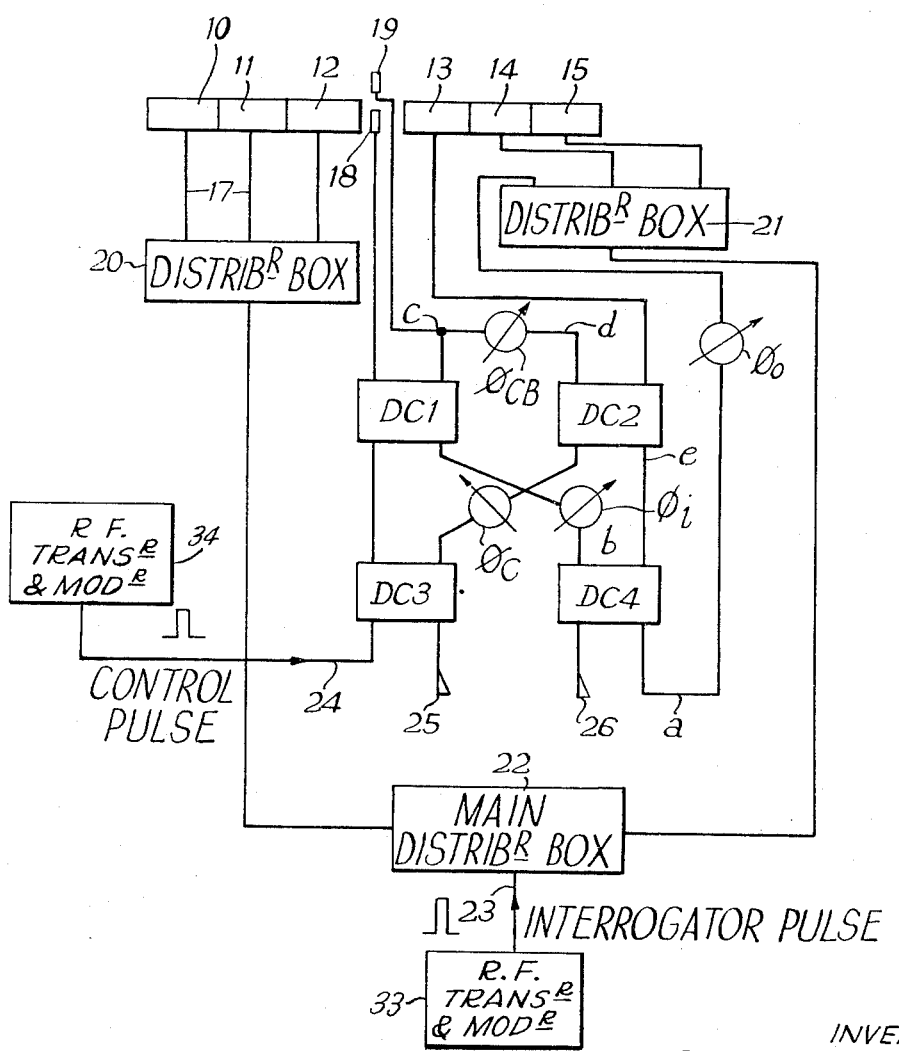
FIG. 1 is a block circuit diagram of one embodiment of the invention.
Figure 2:
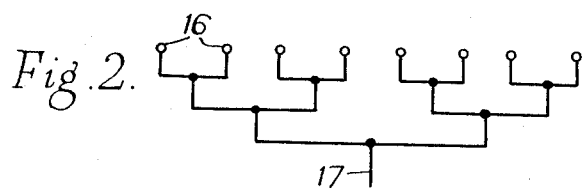
FIG. 2 is a diagram showing in plane view the constitution of one of the octets in the aerial array of FIG. 1.

Referring to FIG. 1, the directive aerial array comprises six octets 10, 11, 12, 13, 14 and 15 all arranged in the same horizontal plane and each constituted as shown in FIG. 2 of eight unipoles 16 connected to a common feeder 17. The control aerial consists of a front unipole 18 in line with the unipoles of the directive array and a back unipole 19 behind the unipole 18.

All the octets excepting 13 which will be dealt with later are fed from side distributor boxes 20 and 21 which in turn are fed from a main distributor box 22. Radio frequency energy modulated with interrogator pulses is fed from an R.F. generator and pulse modulator 33 to the main distributor 22 at 23 and radio frequency energy modulated with control pulses is fed from an R.F. generator and pulse modulator 34 at 24. The interrogating and control pulses are transmitted in recurrent groups.

The octet 13 is fed from the side distributor box 21 through a phase shifter $\phi_0$ and directional couplers DC4 and DC2. The front control aerial 18 is fed from the distributor box 21 through the phase shifter $\phi_0$, the directional coupler DC4, a phase shifter $\phi_1$ and a directional coupler DC1. Matching loads are provided at 25 and 26.

When a control pulse is applied at 24 it is fed through directional couplers DC3 and DC1 to the front control aerial 18. A small part of the energy is also fed through a phase shifter $\phi_c$ and the directional coupler DC2 to the octet 13 and through $\phi_c$, DC2 and a phase shifter $\phi_{CB}$ to the back control aerial 19.

When an interrogating pulse is applied at 23, this is fed directly through distributor boxes 22, 20 and 21 to all the octets excepting 13. The energy for the octet 13 is fed from 22 to 21 and thence through $\phi_0$, DC4 and DC2. The phase shifter $\phi_0$ is so adjusted that the energy reaching the octet 13 is in phase with that reaching the other octets and the intensities are all made the same. A small amount of the energy is fed from DC4 through $\phi_i$ and DC1 to the control aerial 18, $\phi_i$ being so adjusted that the energy at 18 is in phase with that in the directive array. The feeding of energy during interrogating pulses to the control aerial 18 is optional.

The physical lengths of the cables where used are preferably so cut that the electrical lengths of the paths from the input to 22 to the octets are substantially the same. The dissimilarity of the path to the octet 13 requires the interposition of the phase shifter $\phi_0$ to ensure that the radiation from the octet 13 is in phase with that from 10, 11, 12, 14 and 15.

Any energy fed into the decoupled arms of the directional couplers is very small, for instance about 20 db below the forward signal, and can be neglected.

Figure 3:
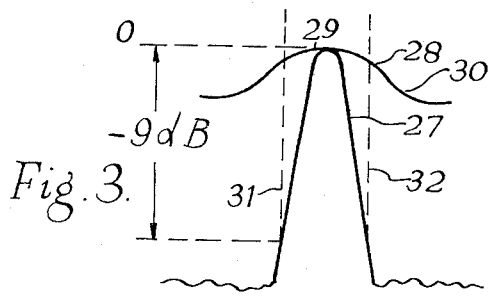
FIG. 3 is a part of the radiation pattern for a two-pulse system and FIG. 4 is part of the radiation pattern for a three-pulse system.

The desired shape of the radiation pattern during control pulses is obtained by adjustment of $\phi_c$. Referring to FIG. 3 there is shown at 27 the radiation pattern of the directive array for a two-pulse system and at 28 a part of the pattern of the radiation during control pulses. Thus here is a discontinuity in the form of a hump at 29 projecting from the general level at 30. It is arranged that the hump between the broken lines 31 and 32 passing through points on the main lobe in the pattern 27 at which the energy is 9 db below that at the peak is approximately flat (for example within 2 db) and that the control aerial radiation has its maximum upon the axis of the directive radiation, this maximum being substantially equal to that of the directional radiation. The amplitude of the hump is controlled by the directional coupler DC3.

Regarding the feeding of the back aerial 19, there are two seemingly incompatible requirements, namely to energise this aerial during control pulses but not during interrogator pulses. Any radiation from this aerial during interrogating pulses would directly add to the amplitude of the back lobe of the interrogating aerial. However the phase shifter $\phi_{CB}$ can be so adjusted as to cancel most, if not all, the energy fed into the loop a, b, c, d, e, a. During control pulses the energy is fed through DC3 and DC1 to point c and thence to 19.

To sum up, the system described operates during interrogator pulses as an in-phase aerial array of six octets and a further element 18. During control pulses it functions as an aerial comprising a single forward radiator 18, a back radiator 19 and a single octet 13.

In order to adapt the circuit of FIG. 1 for the 3-pulse system, it is only necessary to change the value of $\phi_c$. This may be done by plugging in a different phase shifter in place of that used for the 2-pulse system. Alternatively, if preferred, switching means may be provided for varying the length of transmission line in order to change the value of $\phi_c$. Gas switches may be used for this purpose in an arrangement analogous to phase-shift duplexing.

Figure 4:
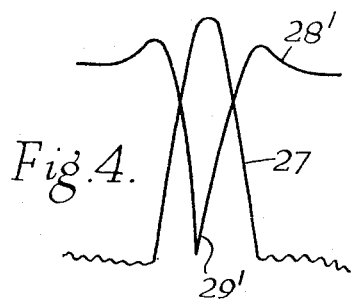

By suitably changing $\phi_c$ it is possible to replace the hump 29 in FIG. 3 by a trough 29' in the control radiation pattern 28' as shown in FIG. 4, the amplitude and width of the negative-going trough being appropriately adjusted.

In a modification of FIG. 1, which is a little simpler than the arrangement shown, the back control aerial 19 is fed directly from the control pulse input 24 and suitably reduced in power by means of a power divider. The phase shifter $\phi_{CB}$ is then dispensed with and the redundant outputs on DC1 and DC2 are terminated in matched loads.

All the components shown in FIG. 1 are preferably mounted upon the aerial boom. In this way it is easier to achieve the accurate adjustment of amplitude and phase at the aerial elements than is possible when any of the equipment is located away from the aerial structure and is connected to the aerial structure through a feeder.

While cables are ordinarily employed for interconnecting the components of the aerial feed system described above, the distributive connections to the unipole radiators, as also the form of the directional couplers and distributors, can be engineered in printed circuit form.

I claim:

1. A secondary radar transmitter comprising: a control aerial adapted to radiate substantially omnidirectionally; a directional interrogating aerial including an array of aerial elements; means for generating recurrent groups of radio frequency pulses, each group including at least one control pulse and at least one interrogating pulse; means for feeding said interrogating pulses to all the elements of said directional aerial to produce a narrow beam of radiation; and means for feeding said control pulses to said control aerial and simultaneously to a portion only of said elements of said interrogating aerial to produce a substantially omnidirectional radiation pattern having a discontinuity therein in the direction of the said narrow beam.

2. A secondary radar transmitter according to claim 1 including phase-shifting means in the path of said control pulses to said portion of the interrogating aerial, to permit adjustment of the shape of the radiation pattern during control pulses.

3. A secondary radar transmitter according to claim 1, wherein said control aerial comprises a front element aligned with the elements of said interrogating aerial and a back element located behind the front element.

4. A secondary radar transmitter according to claim 3, wherein all said elements are disposed in the same horizontal plane.

5. A secondary radar transmitter according to claim 3, including phase shifting means and means for feeding control pulse energy through said phase-shifting means to said back element.

6. A secondary radar system according to claim 1, wherein said control element comprises a front element aligned with the elements of said interrogating aerial and a back element located behind the front element, said system further comprising a single phase-shifting means coupled in the path of said control pulses to said portion of said interrogating aerial and also in the path of said control pulses to said back element.

References Cited by the Examiner
UNITED STATES PATENTS

| | | | |
|---|---|---|---|
| 2,682,050 | 6/54 | Alford | 343—107 |
| 2,774,966 | 12/56 | Granqvist | 343—107 |
| 2,966,675 | 12/60 | Smoll | 343—107 |

KATHLEEN H. CLAFFY, *Primary Examiner.*

CHESTER L. JUSTUS, *Examiner.*